United States Patent
Koi

(10) Patent No.: US 10,700,365 B2
(45) Date of Patent: Jun. 30, 2020

(54) CELL, CELL STACK DEVICE, MODULE AND MODULE CONTAINING DEVICE

(71) Applicant: KYOCERA Corporation, Kyoto-shi, Kyoto (JP)

(72) Inventor: Makoto Koi, Kirishima (JP)

(73) Assignee: KYOCERA Corporation, Kyoto-shi, Kyoto (JP)

(*) Notice: Subject to any disclaimer, the term of this patent is extended or adjusted under 35 U.S.C. 154(b) by 0 days.

(21) Appl. No.: 16/079,136

(22) PCT Filed: Feb. 16, 2017

(86) PCT No.: PCT/JP2017/005625
§ 371 (c)(1),
(2) Date: Aug. 23, 2018

(87) PCT Pub. No.: WO2017/145902
PCT Pub. Date: Aug. 31, 2017

(65) Prior Publication Data
US 2019/0067710 A1   Feb. 28, 2019

(30) Foreign Application Priority Data
Feb. 25, 2016  (JP) ................................. 2016-034520

(51) Int. Cl.
| H01M 8/0271 | (2016.01) |
| H01M 8/1246 | (2016.01) |
| H01M 8/2425 | (2016.01) |
| H01M 8/2475 | (2016.01) |
| H01M 8/2484 | (2016.01) |

(Continued)

(52) U.S. Cl.
CPC ........... *H01M 8/0271* (2013.01); *H01M 8/02* (2013.01); *H01M 8/04* (2013.01); *H01M 8/12* (2013.01); *H01M 8/1246* (2013.01); *H01M 8/24* (2013.01); *H01M 8/2425* (2013.01); *H01M 8/2475* (2013.01); *H01M 8/2484* (2016.02); *H01M 2008/1293* (2013.01); *H01M 2300/0074* (2013.01); *Y02E 60/525* (2013.01)

(58) Field of Classification Search
None
See application file for complete search history.

(56) References Cited

U.S. PATENT DOCUMENTS

| 6,663,994 B1 * | 12/2003 | Fly |
| 2011/0256464 A1 * | 10/2011 | Muramatsu ......... H01M 4/8605 |
| | | 429/465 |

(Continued)

FOREIGN PATENT DOCUMENTS

| EP | 0275356 A1 | 7/1988 |
| EP | 2980899 A1 | 2/2016 |

(Continued)

*Primary Examiner* — Haroon S. Sheikh
(74) *Attorney, Agent, or Firm* — Viering, Jentschura & Partner MBB

(57) ABSTRACT

A cell may include a columnar support having a first main face and a second main face; and an element comprising a first electrode layer, a solid electrolyte layer, and a second electrode layer laminated in sequence on the first main face of the support. The porosity of at least one of the two end portions of the support in the longitudinal direction L may be lower than that of the central portion of the support in the longitudinal direction L.

5 Claims, 14 Drawing Sheets

(51) Int. Cl.
   *H01M 8/12* (2016.01)
   *H01M 8/04* (2016.01)
   *H01M 8/24* (2016.01)
   *H01M 8/02* (2016.01)
   *H01M 8/124* (2016.01)

(56) References Cited

U.S. PATENT DOCUMENTS

2016/0211542 A1   7/2016  Nishihara et al.
2016/0372774 A1   12/2016 Koi

FOREIGN PATENT DOCUMENTS

| EP | 3214682 A1 | 9/2017 |
|---|---|---|
| JP | 2011017055 A | 1/2011 |
| JP | 2011192635 A | 9/2011 |
| JP | 2015159027 A | 9/2015 |
| KR | 1020120040384 A | 4/2012 |
| WO | 2014208730 A1 | 12/2014 |
| WO | 2015030215 A1 | 3/2015 |

* cited by examiner

CELL, CELL STACK DEVICE, MODULE AND MODULE CONTAINING DEVICE

CROSS-REFERENCE TO RELATED APPLICATIONS

This application is a national stage entry according to 35 U.S.C. 371 of PCT Application No. PCT/JP2017/005625 filed on Feb. 16, 2017, which claims priority to Japanese Application No. 2016-034520 filed on Feb. 25, 2016, which are entirely incorporated herein by reference.

TECHNICAL FIELD

The present disclosure relates to a cell, a cell stack assembly, a module, and a module-accommodating assembly.

BACKGROUND

Various fuel cell systems including cell stack assemblies have been proposed as next generation energy sources. Such a cell stack assembly includes fuel cells electrically connected in series and accommodated in a container.

The fuel cells in the cell stack assembly have lower end portions bonded to a manifold with a bonding agent, such as glass, and fuel gas that has not been consumed in power generation is combusted in upper end portions of the fuel cells.

Unfortunately, such a cell stack assembly undergoes cracking in upper end portions and lower end portions of the fuel cells due to concentration of stress on the upper and lower end portions, which may impair the long-term reliability. Thus, a proposed fuel cell is provided with a reinforcement layer to enhance the robustness of the upper and lower end portions (see, for example, Patent Literature 1).

PL 1: WO2014/208730

SUMMARY

A cell according to the present disclosure may include: a columnar support having a first main face and a second main face; and an element including a first electrode layer, a solid electrolyte layer, and a second electrode layer, laminated in sequence on the first main face of the support. The porosity of at least one of two end portions of the support in the longitudinal direction is lower than that of the central portion of the support in the longitudinal direction.

A cell stack assembly according to a non-limiting embodiment of the present disclosure includes a plurality of the cells described above, and one of the end portions of the support is bonded to a manifold with a bonding agent.

A module according to a non-limiting embodiment of the present disclosure accommodates the cell stack assembly described above.

A module accommodation assembly according to a non-limiting embodiment of the present disclosure includes an exterior case accommodating the module described above and accessories for operation of the module.

BRIEF DESCRIPTION OF DRAWINGS

FIG. 1 illustrates an exemplary hollow flat-plate cell according to a non-limiting embodiment.

FIG. 4 is an exemplary cell stack assembly according to a non-limiting embodiment.

FIG. 6 illustrates another exemplary cell according to a non-limiting embodiment.

DETAILED DESCRIPTION

Figure 1A:
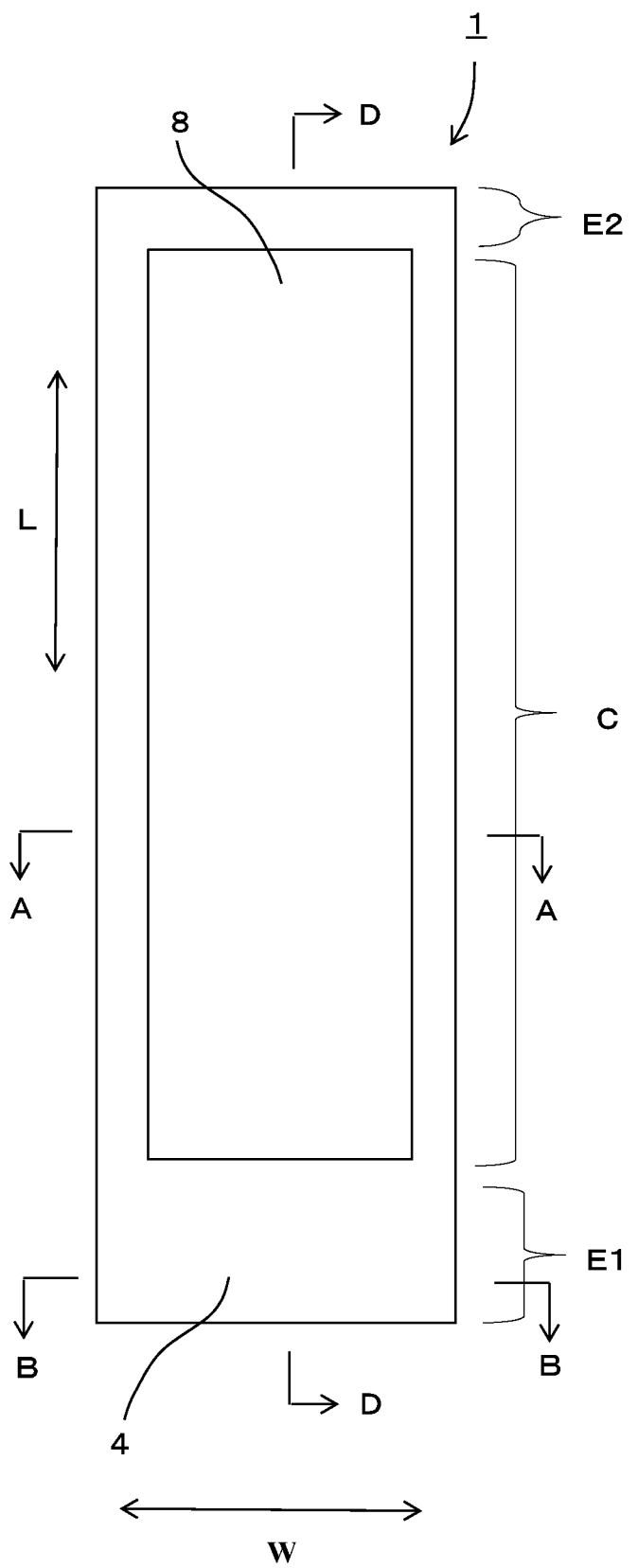
FIG. 1A is a side view of the cell at an interconnection layer.

A cell, a cell stack assembly, a module, and a module-accommodating assembly will now be described in reference to FIGS. 1A to 10.

A solid oxide fuel cell (SOFC) will now be described as an exemplary cell. It should be noted that the same components are denoted by the same reference numerals or symbols.

Figure 1B:
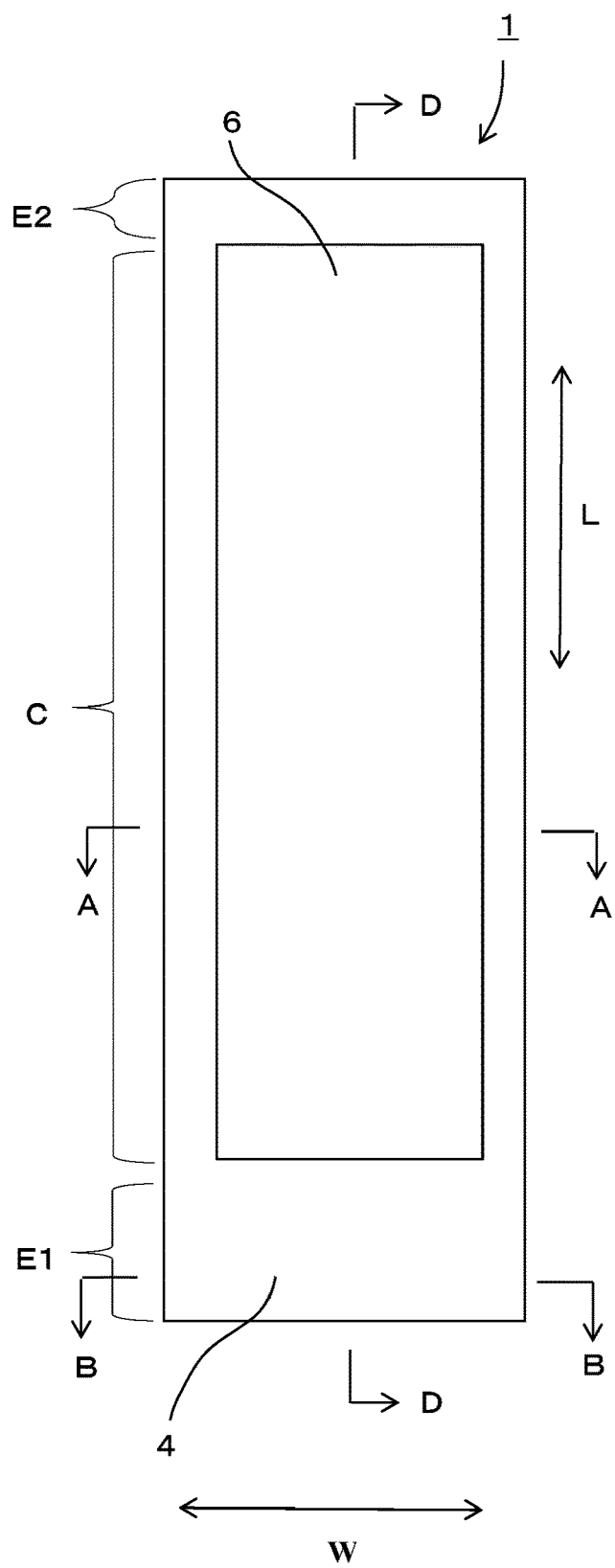
FIG. 1B is a side view of the cell at an oxygen electrode layer.
Figure 2A:
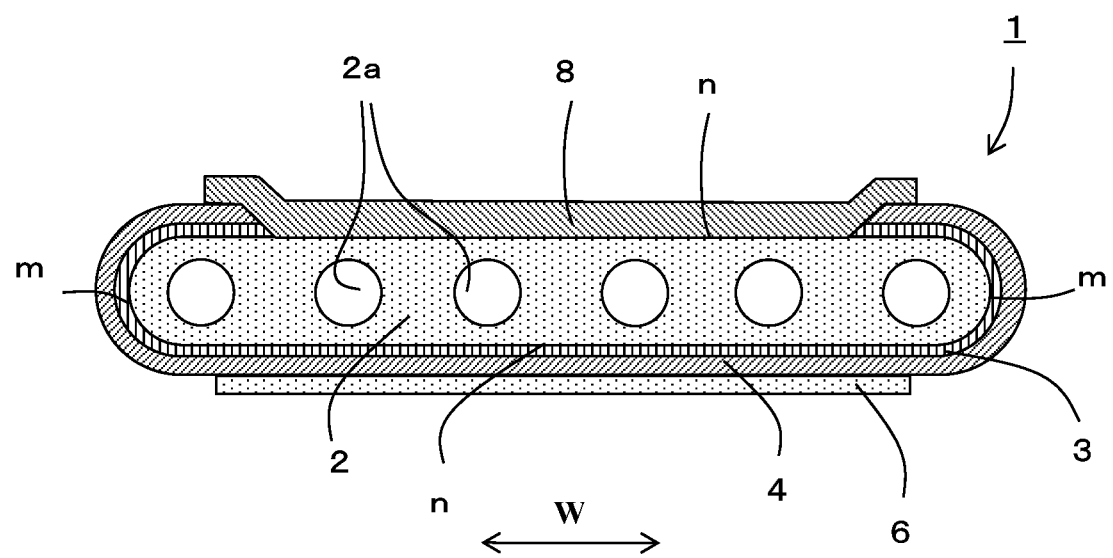
FIG. 2A is a cross-sectional view taken along lines A-A in FIGS. 1A and 1B.
Figure 2B:
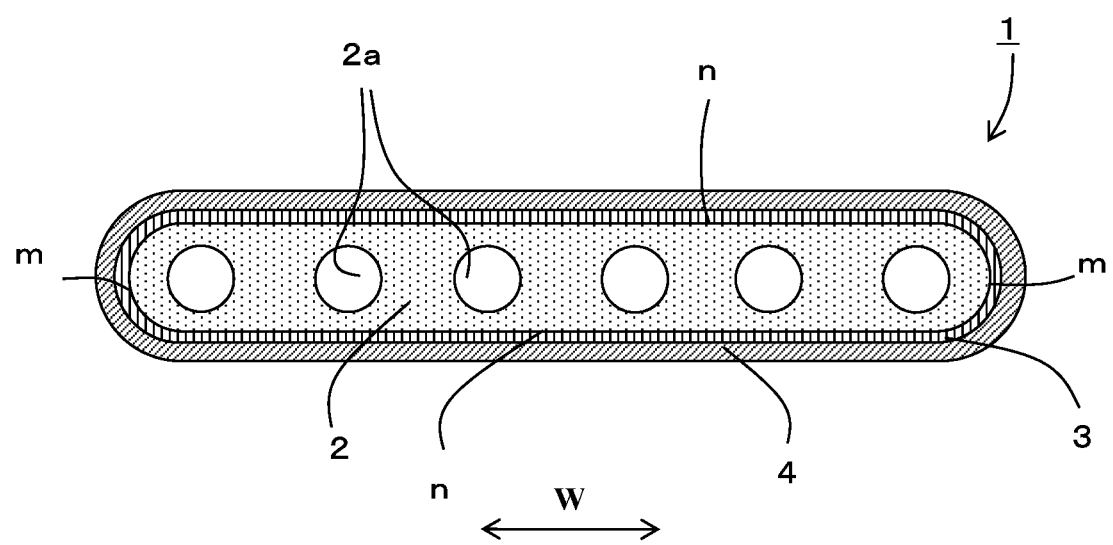
FIG. 2B is a cross-sectional view taken along lines B-B in FIGS. 1A and 1B.
Figure 3:
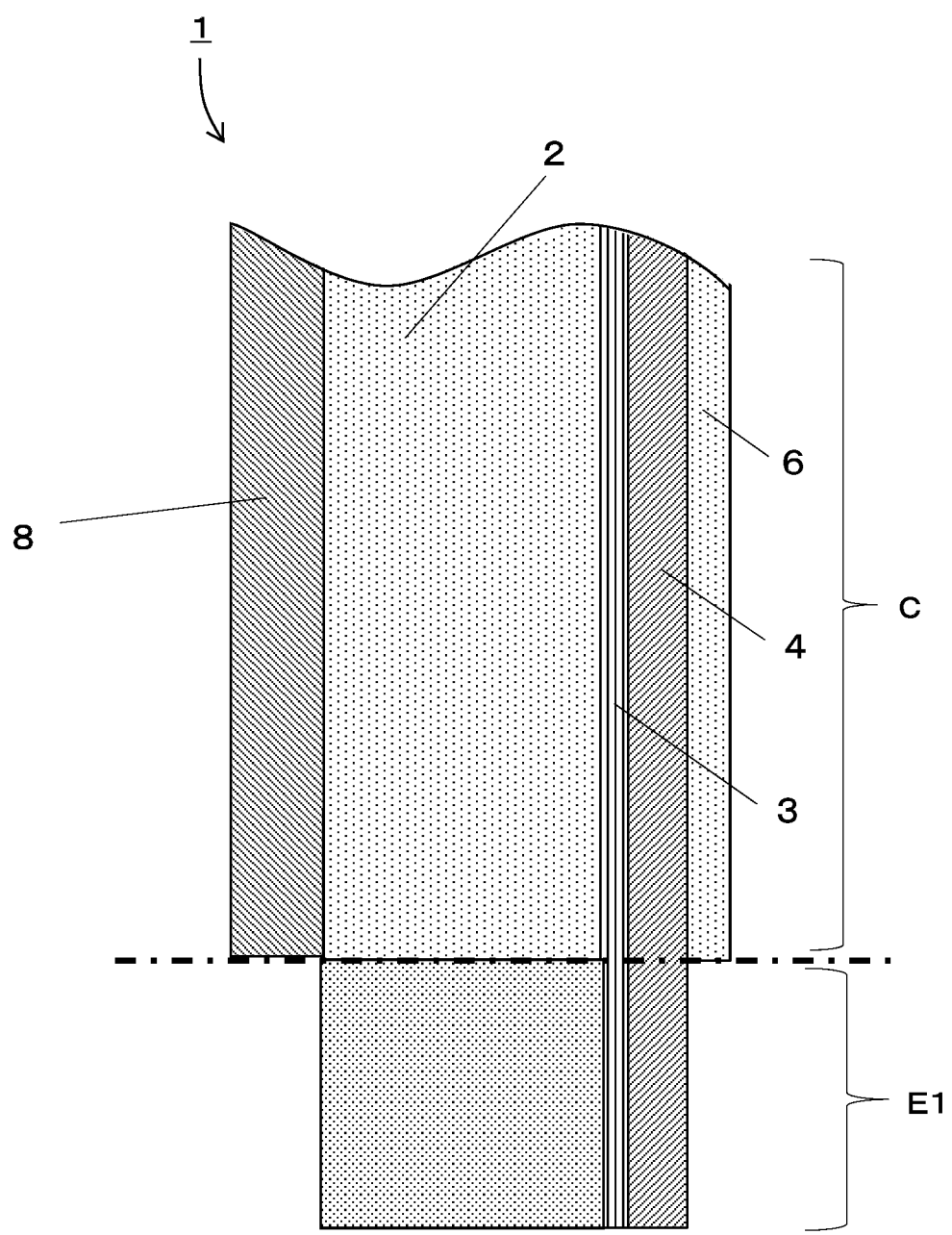
FIG. 3 is a cross-sectional view taken along lines D-D in FIGS. 1A and 1B.

FIGS. 1A and 1B illustrate an exemplary cell according to a non-limiting embodiment. FIG. 1A is a side view of the cell at an interconnection layer. FIG. 1B is a side view of the cell at an oxygen electrode layer. FIG. 2A is a cross-sectional view taken along lines A-A in FIGS. 1A and 1B. FIG. 2B is a cross-sectional view taken along lines B-B in FIGS. 1A and 1B. FIG. 3 is a cross-sectional view taken along lines D-D in FIGS. 1A and 1B.

In FIGS. 1A and 1B, a reference symbol C indicates the central portion of a support 2, a reference symbol E1 indicates the lower end portion of the support 2, and a reference symbol E2 indicates the upper end portion of the support 2.

A cell 1 in FIGS. 1A to 3 includes the conductive support 2 of a hollow flat-plate having a low-profile cross-section and a substantially elliptically cylindrical shape (in other words, an elliptically columnar shape). In the interior of the support 2, gas channels 2a disposed at appropriate intervals extend in the longitudinal direction L of the cell 1. The cell 1 is provided with various components on the support 2.

In the cell 1 illustrated in FIGS. 1A, 1B, and 2, the support 2 has two opposite main faces n, i.e., a first main face and a second main face, and two opposite side faces m connecting the first main face to the second main face as is apparent from the shapes illustrated in FIGS. 2A and 2B. A first electrode layer or porous fuel electrode layer 3 is provided so as to cover the first main face n (bottom) and the two side faces m. Furthermore, a solid electrolyte layer 4 is provided so as to cover the fuel electrode layer 3. The solid electrolyte layer 4 is composed of a gas-impermeable ceramic. The ceramic may have a thickness of 40 μm or less, alternatively 20 μm or less, or 15 μm or less in another non-limiting embodiment to enhance the power generation capacity.

In the cell 1 of FIGS. 1A to 3, a second electrode layer or oxygen electrode layer 6 is provided on the solid electrolyte layer 4 adjacent to the first main face n. The solid electrolyte layer 4 is disposed between the oxygen electrode layer 6 and the fuel electrode layer 3.

The second main face (top) is provided with an interconnection layer 8 composed of a gas-impermeable ceramic instead of the oxygen electrode layer 6.

In other words, the cell 1 is provided with the fuel electrode layer 3 and the solid electrolyte layer 4 extending from the first main face n (bottom) via the arcuate sides m to the second main face n (top). The interconnection layer 8 is laminated onto the solid electrolyte layer 4 such that the interconnection layer 8 extends toward the left and right ends of the solid electrolyte layer 4.

The solid electrolyte layer 4 and the interconnection layer 8 are both gas-impermeable and surround the support 2 such that fuel gas circulating inside does not leak to the outside environment. In other words, the solid electrolyte layer 4 and the interconnection layer 8 define an elliptically cylindrical and gas-impermeable tube, which serves as a fuel gas flow channel. Thus, fuel gas supplied to the fuel electrode layer 3 and oxygen-containing gas supplied to the oxygen electrode layer 6 are not permeated through the elliptically cylindrical tube.

Specifically, as illustrated in FIG. 1A, the interconnection layer 8 having a rectangular planer shape extends toward the upper and lower end portions of the support 2 on the second main face n of the support 2. As illustrated in FIG. 1B, the oxygen electrode layer 6 having a rectangular and planar shape extends toward the upper and lower ends of the support 2 on the first main face n of the support 2.

The fuel electrode layer 3 and the oxygen electrode layer 6 separated by the solid electrolyte layer 4 in the cell 1 together function as a power generation element. In detail, the oxygen-containing gas is fed to the exterior of the oxygen electrode layer 6 and the fuel gas (hydrogen-containing gas) is fed into the gas channels 2a in the support 2. The gases are then heated to a predetermined operational temperature to generate power. Electric currents produced by such power generation is collected through the interconnection layer 8 on the support 2.

Components of the cell 1 according to a non-limiting embodiment will now be described.

The support 2 should be gas-permeable to allow the fuel gas to permeate the fuel electrode layer 3 and should be conductive to collect power through the interconnection layer 8. Thus the support may be composed of, for example, Ni and/or NiO and an inorganic oxide, such as a certain rare earth oxide.

The certain rare earth oxide is used to equalize the thermal expansion coefficient of the support 2 to that of the solid electrolyte layer 4. The oxide of at least one rare earth element selected from the group consisting of Y, Lu, Yb, Tm, Er, Ho, Dy, Gd, Sm, and Pr, may be used in combination with Ni and/or NiO. Examples of the rare earth oxides include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, $Pr_2O_3$. Among these, $Y_2O_3$ and $Yb_2O_3$ are usable, which barely dissolve and react with Ni and/or NiO, have a thermal expansion coefficient comparable to that of the solid electrolyte layer 4, and are relatively inexpensive.

In a non-limiting embodiment, in order to impart a sufficient conductivity and a thermal expansion coefficient equalized to that of the solid electrolyte layer 4 to the support 2, the volume ratio of the Ni and/or NiO to a rare earth oxide may range from 35:65 to 65:35.

It should be noted that the support 2 may contain any other metal component and oxide component within contents not impairing the required properties.

The support 2 should have fuel gas permeability and is thus porous. The support 2 may have an open porosity of 20% or more, in particular in the range of 25% to 50%. The support 2 may have an electroconductivity of 300 S/cm or more, in particular 440 S/cm or more.

The length of the flat face n of the support 2 (the length of the support 2 in the width direction W) ranges, for example, from 15 mm to 35 mm. The length of the arcuate side m (the length of the arc) ranges from 2 mm to 8 mm. The thickness of the support 2 (the distance between the flat faces n) ranges from 1.5 mm to 5 mm. The height of the support 2 ranges, for example, from 100 mm to 300 mm.

The fuel electrode layer 3 causes an electrode reaction and can be composed of a known porous conductive ceramic. The fuel electrode layer 3 may be composed of, for example, $ZrO_2$ or $CeO_2$ that contains dissolved rare earth oxide in combination of Ni and/or NiO. The rare-earth elements listed above with respect to the support 2 can be used. For example, $ZrO_2$ (YSZ) containing dissolved $Y_2O_3$ can be combined with Ni and/or NiO.

The content of $ZrO_2$ or $CeO_2$ containing dissolved rare earth oxide in the fuel electrode layer 3 may range from 35% to 65% by volume, and the content of Ni or NiO may range from 65% to 35% by volume. The open porosity of the fuel electrode layer 3 may be 15% or more, in particular in the range of 20% to 40%. The thickness of the fuel electrode layer 3 may range from 1 μm to 30 μm.

The fuel electrode layer 3 should be disposed in parallel to the oxygen electrode layer 6; hence, the fuel electrode layer 3 may be provided, for example, only on the flat face n at the bottom onto which the oxygen electrode layer 6 is disposed. In other words, the fuel electrode layer 3 may be provided only on the flat face n at the bottom of the support 2, and the solid electrolyte layer 4 is provided on the flat face n on the top and at the arcuate sides m of the support 2 where the fuel electrode layer 3 is not disposed.

As described above, the solid electrolyte layer 4 may contain a partially or fully stabilized $ZrO_2$ containing dissolved rare earth oxide, such as Y, Sc, and Yb, in a molar content ranging from 3% to 15% as a main component. In a non-limiting embodiment, Y may be preferred as the rare-earth element, as it is inexpensive. The material for the solid electrolyte layer 4 should not be limited to the ceramics consisting of partially or fully stabilized $ZrO_2$, but may include known ceria-based or lanthanum-gallate-based metals containing dissolved rare earth elements, such as Gd and Sm.

The oxygen electrode layer 6 may be composed of a conductive ceramic consisting of a so-called $ABO_3$ perovskite oxide. Such perovskite oxides are composed of transition metals containing La, in particular, at least one of $LaMnO_3$ based oxide, $LaFeO_3$ based oxide, and $LaCoO_3$ based oxide, all of which contain coexisting Sr and La in the A site, may be used in a non-limiting embodiment. $LaCoO_3$ based oxide may be preferred in a non-limiting embodiment because it has a high electroconductivity at an operational temperature ranging from 600° C. to 1000° C. These perovskite oxides may contain Fe and Mn in addition to Co in the B site.

The oxygen electrode layer 6 should have gas permeability, for example, having an open porosity of 20% or more, or, alternatively, in the range of 30% to 50% in another non-limiting embodiment. The oxygen electrode layer 6 may have a thickness in the range of 30 μm to 100 μm in view of collection of power.

The interconnection layer 8 is composed of a conductive ceramic. The interconnection layer 8 is exposed to the fuel gas (hydrogen-containing gas) and oxygen-containing gas and should thus have resistance to reduction and oxidation reactions. Thus, for example, lanthanum chromite ($LaCrO_3$) perovskite oxide is used as a conductive ceramic having resistance to reduction and oxidation reactions. In order to equalize the thermal expansion coefficient of the interconnection layer 8 to that of the support 2 or the solid electrolyte layer 4, $LaCrMgO_3$ oxide containing Mg in the B site is used. The material for the interconnection layer 8 may be any conductive ceramic.

The interconnection layer 8 may have a thickness in the range of 10 μm to 60 μm to prevent gas leakage and reduce its electric resistance. This range of thickness can prevent gases from leaking and reduce the electric resistance.

Figure 4A:
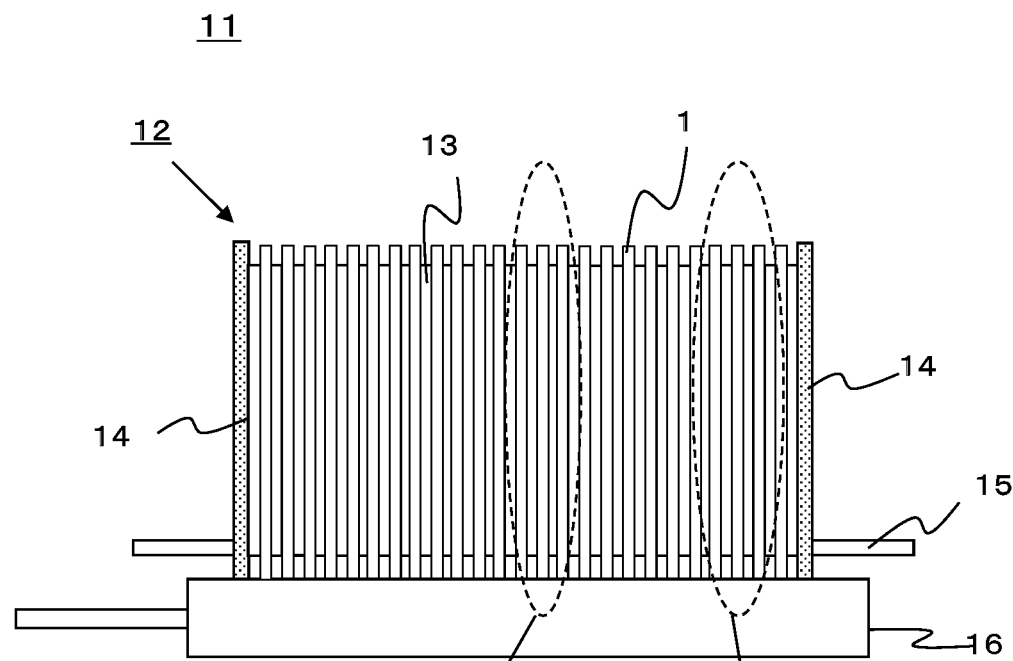
FIG. 4A is a schematic side view of the cell stack assembly.
Figure 4B:
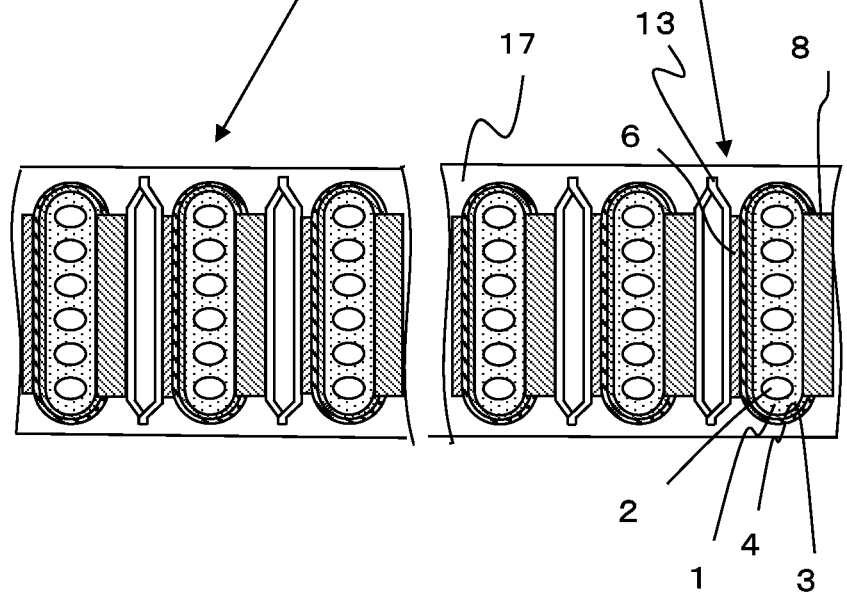
FIG. 4B is an enlarged cross-sectional view of the cell stack assembly circled by dotted lines in FIG. 4A.

FIG. 4 illustrates an exemplary cell stack assembly 11 including multiple cells 1 electrically connected in series through electroconductive members 13. FIG. 4A is a schematic side view of the cell stack assembly 11; and FIG. 4B is an enlarged cross-sectional view of the extracted portions of the cell stack assembly 11 circled by dotted lines in FIG. 4A. For clarity, the circled portions in FIG. 4A are indicated by arrows in FIG. 4B.

In the cell stack assembly 11, the cells 1 are arrayed with the electroconductive members 13 disposed between the cells 1 into a cell stack 12. The lower end portion E1 of each cell 1 is fixed to a manifold 16 with an insulating bonding agent 17, such as glass seal. The manifold 16 is configured to supply the cells 1 with fuel gas. Two elastically deformable electroconductive members 14 are fixed to the manifold 16 like the lower end portions E1 of the cells 1, and tightly hold the cell stack 12 from its both sides in the direction of the array of cells 1.

The electroconductive members 14 of FIG. 4 are each provided with a current extractor 15 that extends along the array of cells 1 to the exterior and extracts the electric current generated in the cell stack 12 (cells 1). As will be described below, the fuel gas discharged from the gas channel 2a in the cell 1 is combusted by the reaction with the oxygen-containing gas in the upper end portion E2 of the cell 1. The reaction can raise the temperature of the cell 1 to accelerate the activation of the cell stack assembly 11.

Figure 5:
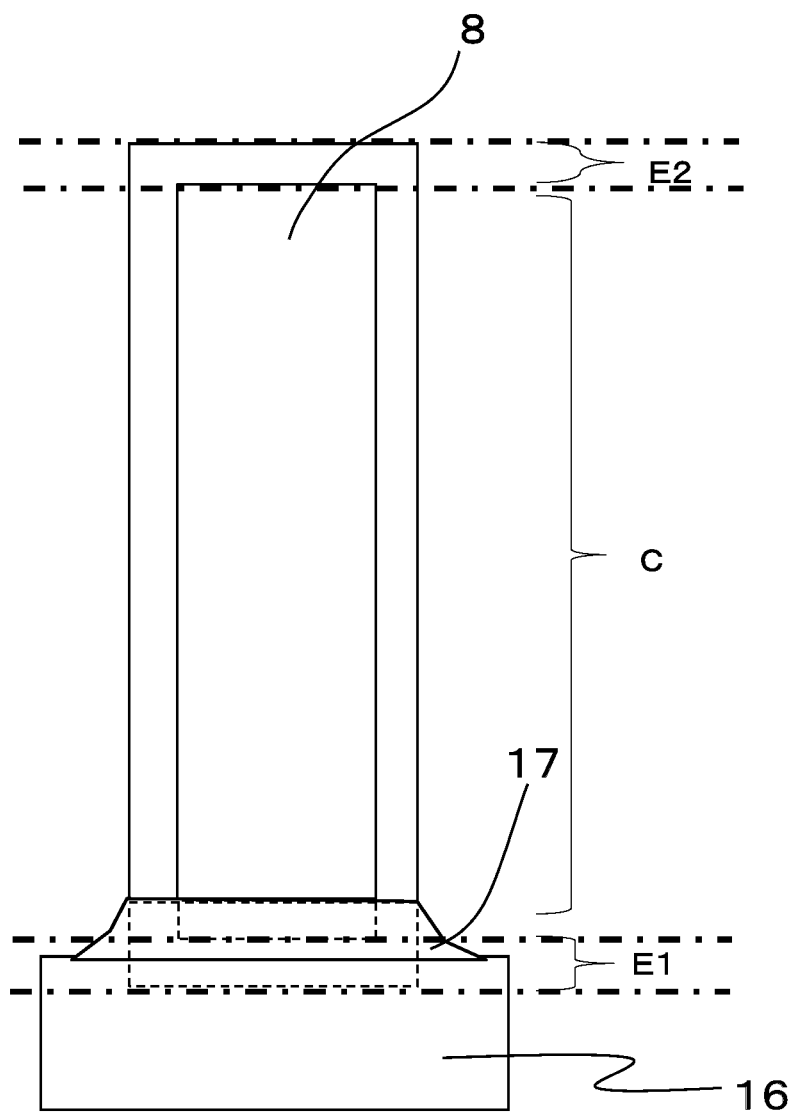
FIG. 5 is a side view seen from the interconnection layer and illustrating the cells of FIG. 1 fixed to a manifold.

FIG. 5 is a side view of the cell 1 shown in FIGS. 1A and 1B fixed to the manifold, seen from the interconnection layer 8. In other words, FIG. 5 is a side view of the cell stack assembly 11 in FIG. 4 seen from the interconnection layer 8.

In FIG. 5, the lower end portion E1 of the cell 1 is bonded to the manifold 16 with the bonding agent 17. The interconnection layer 8 containing lanthanum chromite is disposed in the central portion C in the longitudinal direction L of the support 2.

In FIG. 3, the lower end portion E1 in the longitudinal direction L of the support 2 has lower porosity than the central portion C in the longitudinal direction L of the support 2. The lower end portion E1 of the support 2 thereby has enhanced mechanical robustness against cracking.

Although not illustrated in FIG. 3, the upper end portion E2 of the support 2 has lower porosity than the central portion C of the support 2. The upper end portion E2 of the support 2 thereby has enhanced robustness against cracking that will occur by combustive heat stress.

As illustrated in FIGS. 1A to 3, in the cell 1 according to a non-limiting embodiment, the second main face in the central portion C of the support 2 is provided with the interconnection layer 8 containing lanthanum chromite. Thus, the second main face in the central portion C of the support 2 may have a lower porosity than the first main face in the central portion C. In other words, the second main face in the central portion C of the support 2 is provided with the interconnection layer 8 having a different shrinkage factor from the support 2. Meanwhile, the first main face of the support 2 is provided with the fuel electrode layer 3 and the solid electrolyte layer 4 each having a shrinkage factor comparable to that of the support 2. In the case that these are simultaneously baked, the second main face in the central portion C of the support 2 is likely to undergo tensile stress; hence, the second main face in the central portion C of the support 2 has lower porosity than the first main face in the central portion C, so that the sintered second main face of the support 2 is denser than the first main face of the support 2. The second main face in the central portion C of the support 2 thereby has enhanced robustness, resulting in reductions in tensile stress and cracking on the support 2.

The upper end portion and the lower end portion herein refer to two end portions of the support 2 equally divided into seven portions in the longitudinal direction L. The central portion C refers to the remaining divided portion.

The first main face and the second main face herein refer to two side portions of the support 2 equally divided into three portions in the width direction in the cross section in the longitudinal direction L of the support 2.

Figure 6A:
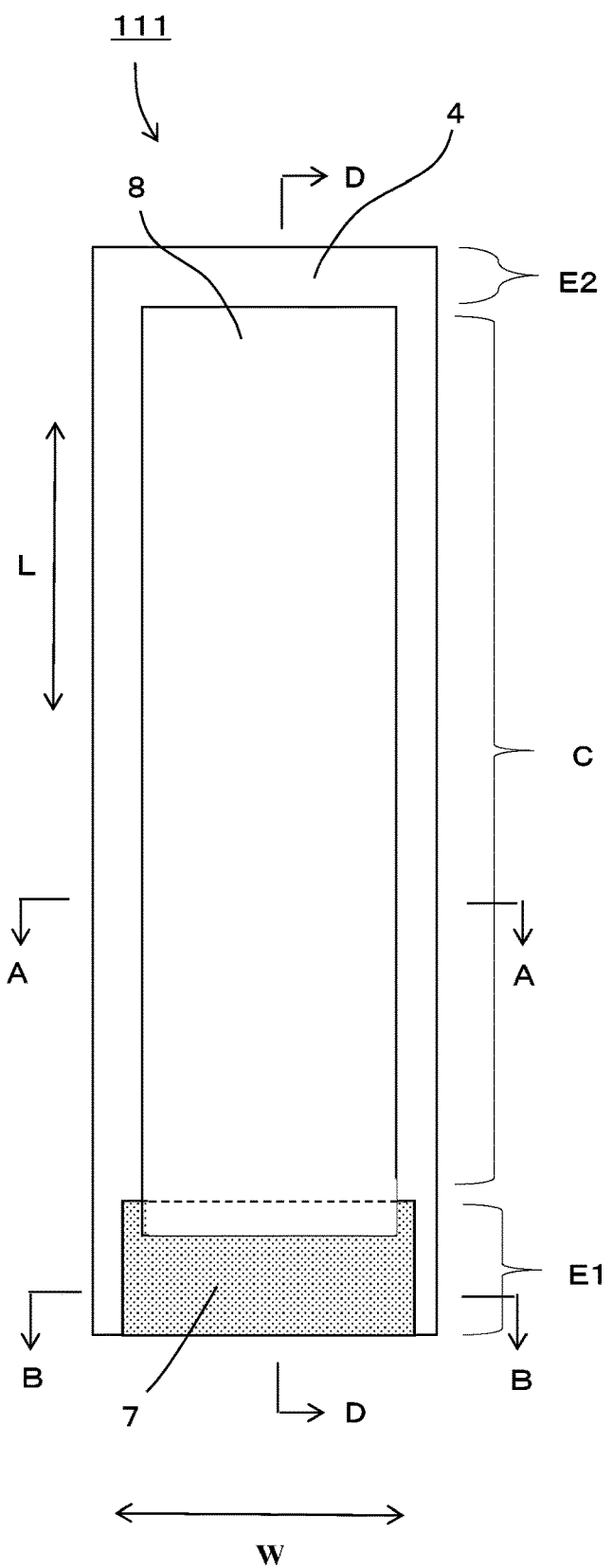
FIG. 6A is a side view at an interconnection layer of the cell.
Figure 6B:
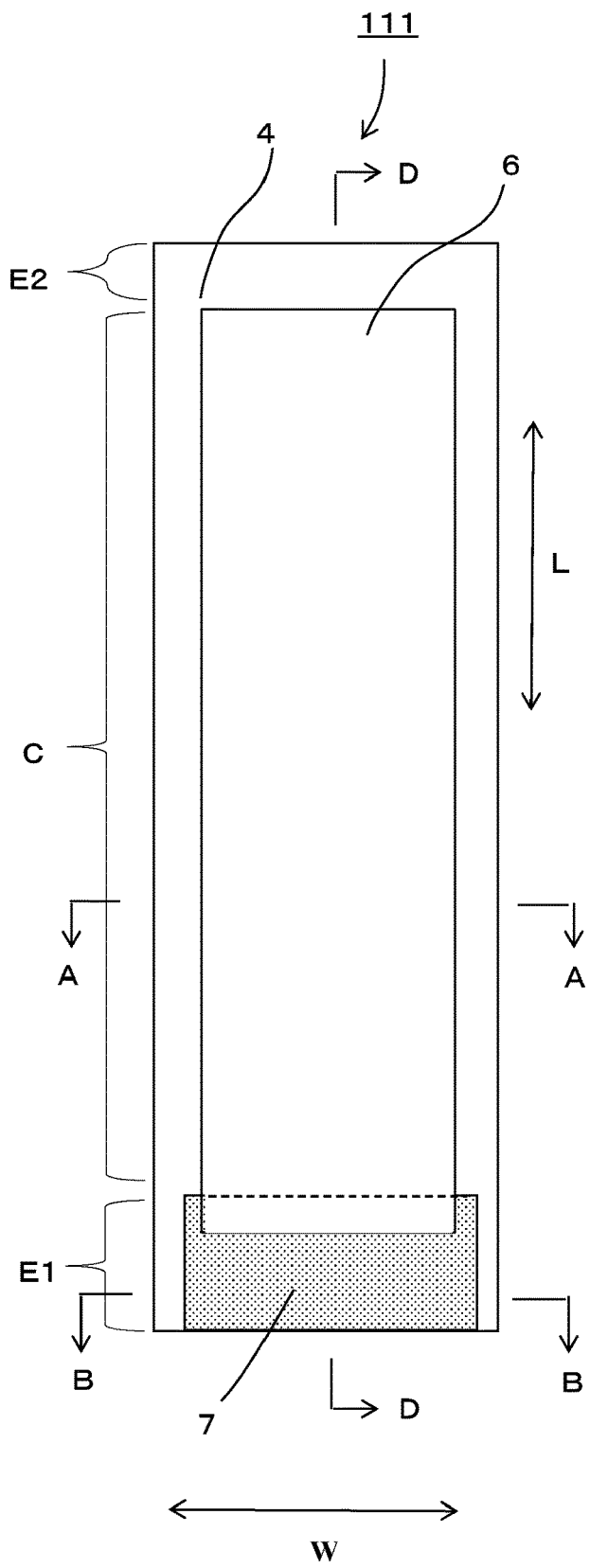
FIG. 6B is a side view at an oxygen electrode layer of the cell.
Figure 7A:
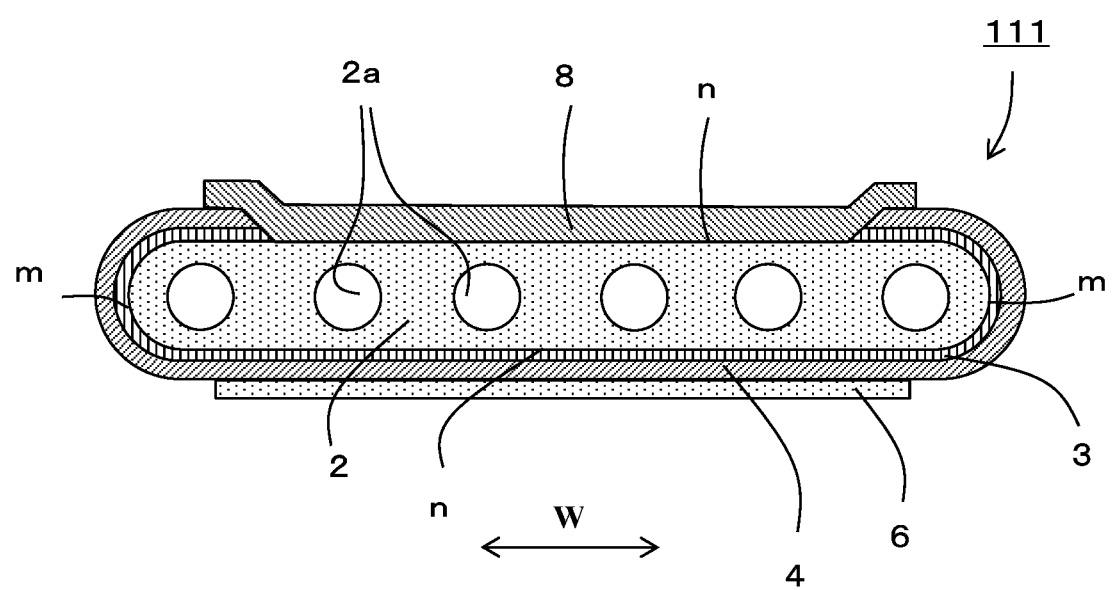
FIG. 7A is a cross-section view taken along lines A-A in FIGS. 6A and 6B.
Figure 7B:
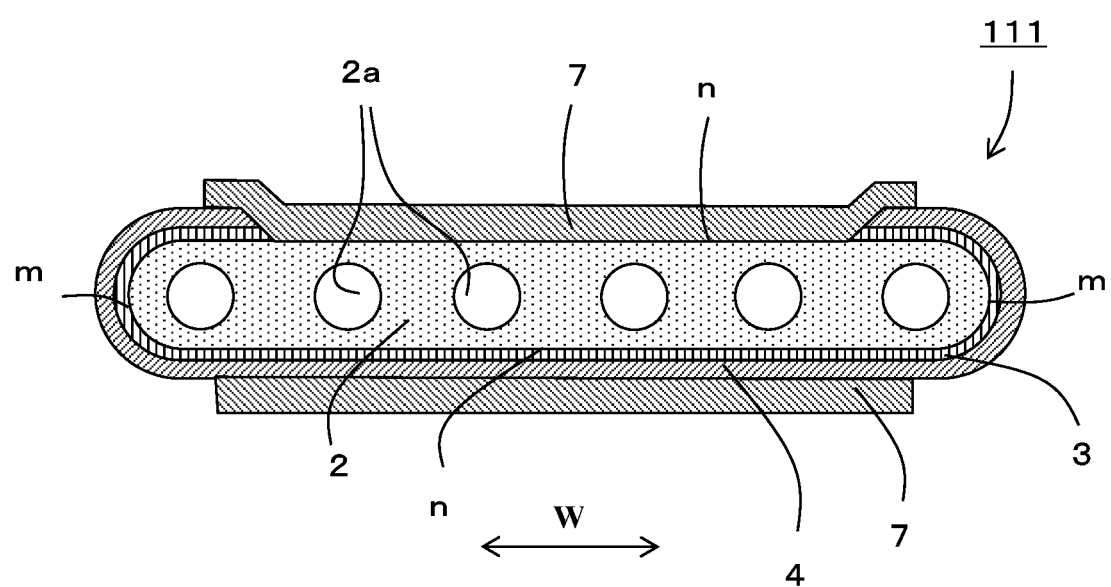
FIG. 7B is a cross-sectional view taken along lines B-B in FIGS. 6A and 6B.
Figure 8:
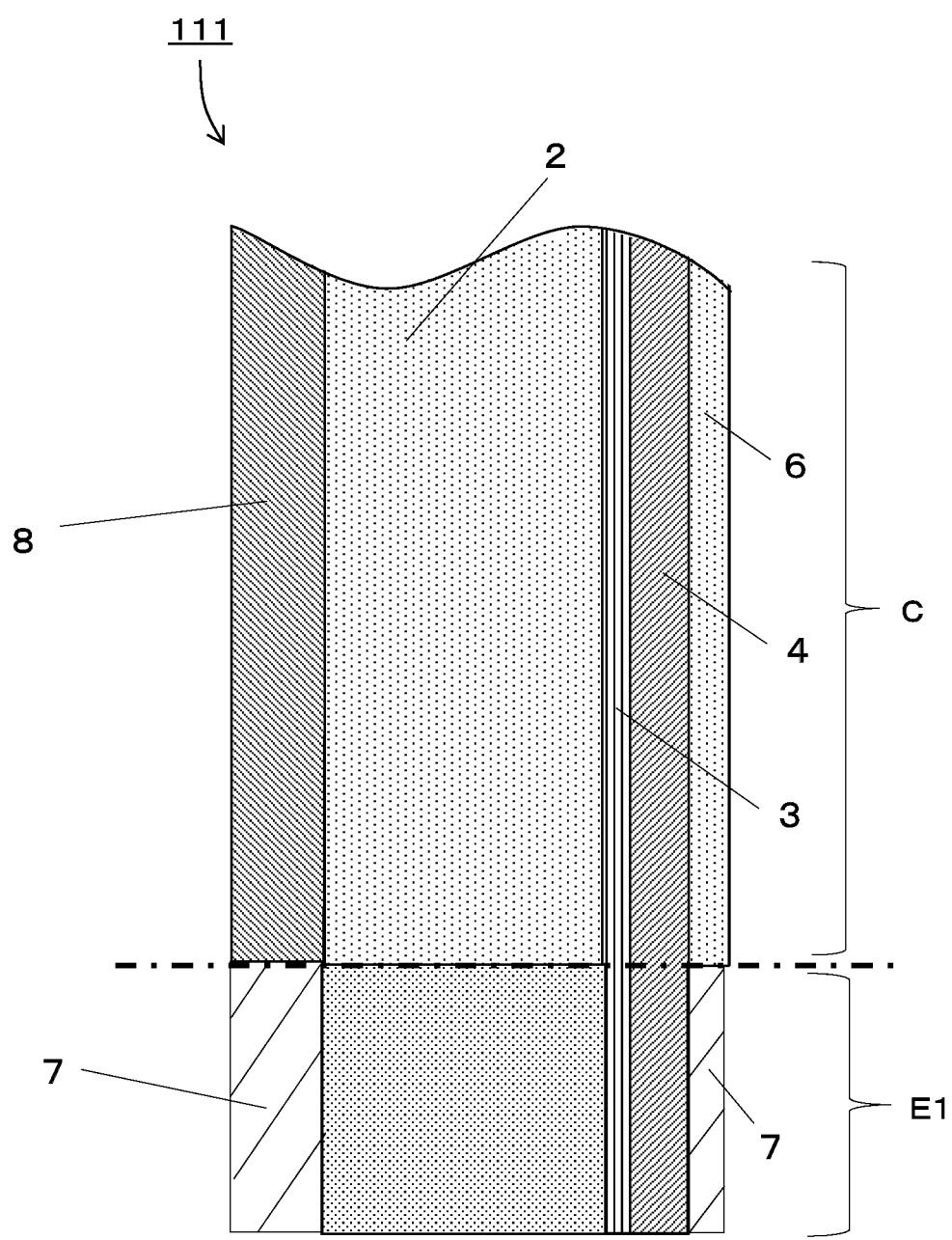
FIG. 8 is a cross-sectional view taken along lines D-D in FIGS. 6A and 6B.

FIGS. 6A and 6B illustrate another exemplary cell 111 according to a non-limiting embodiment: FIG. 6A is a side view at the interconnection layer 8 of the cell 111; and FIG. 6B is a side view at the oxygen electrode layer 6 of the cell 111. FIG. 7A is a cross-sectional view taken along lines A-A in FIGS. 6A and 6B; and FIG. 7B is a cross-sectional view taken along lines B-B in FIGS. 6A and 6B. FIG. 8 is a cross-sectional view taken along lines D-D in FIGS. 6A and 6B.

As illustrated in FIGS. 6A to 8, the cell 111 according to a non-limiting embodiment includes a support 2. The support 2 has a first main face and a second main face. At the lower end portion E1, the support 2 is provided with a solid electrolyte layer 4 and a reinforcement layer 7 in sequence on the first main face and the reinforcement layer 7 on the second main face.

As described above, during a reduction reaction in the cell stack device 11, an interconnection layer 8 is exposed to a reductive atmosphere and reductively expanded whereas the fixed lower end portion E1 of the cell 111 may generate cracks due to stress on the lower end portion E1 of the support 2. Thus, as illustrated in FIGS. 6A to 8, the reinforcement layer 7 is provided in the lower end portion E1 of the support 2. The lower end portion E1 thereby has enhanced robustness, resulting in a reduction in cracking.

In this case, as illustrated in FIG. 8, the second main face of the support 2 is provided with only the reinforcement layer 7 whereas the first main face of the support 2 is provided with two layers having different shrinkage factors (the solid electrolyte layer 4 and the reinforcement layer 7). Thus, the first main face of the support 2 is more likely to undergo stress than the second main face and has a higher risk of cracking than the second main face; hence, in the lower end portion E1 of the support 2, the first main face has a lower porosity than the second main face of the support 2. The first main face of the support 2 thereby has enhanced robustness, resulting in a reduction in cracking.

The reinforcement layer 7 is composed of an oxide containing the same main component as that of the solid electrolyte layer 4 and containing a rare earth oxide in a different content from the solid electrolyte layer 4.

In the case that the main component of the material of the solid electrolyte layer 4 is, for example, $ZrO_2$ containing rare earth oxide, the reinforcement layer 7 may contains less rare earth oxide than the solid electrolyte layer 4. In the case that the main component of the material of the solid electrolyte layer 4 is, for example, $CeO_2$ containing rare earth oxide, the reinforcement layer 7 may contain more rare earth oxide than the solid electrolyte layer 4. The reinforcement layer 7 thereby has enhanced robustness compared to the solid electrolyte layer 4, to protect the lower end portion E1 readily undergoing stress, resulting in a reduction in cracking on the support 2. The main component herein refers to an element occupying 90% or more by volume of the elements building up the solid electrolyte layer 4 and the reinforcement layer 7.

In particular, in the case that the main component of the solid electrolyte layer 4 is, for example, $ZrO_2$ containing dissolved $Y_2O_3$ in a molar content of 7% to 9%, power generation capacity can be enhanced. The main component of the reinforcement layer 7 may be $ZrO_2$ containing dissolved rare earth oxide, for example, $Y_2O_3$ in a molar content of 3% to 5% in a non-limiting embodiment.

Which of the solid electrolyte layer 4 or the reinforcement layer 7 has higher robustness can be determined, for example, as follows: An indenter is forced into exposed portions of the solid electrolyte layer 4 or the reinforcement layer 7 under the same load in a fractured cell 1 after mirror finishing. The robustness is determined from the maximum indentation depth with an ultra-microhardness tester.

The width of the reinforcement layer 7 (the width W of the cell 1) can be appropriately determined and may be equal to or smaller than the width of the first main face n of the support 2. The length of the reinforcement layer 7 equals to that of the cell 1. Alternatively, the length of the reinforcement layer 7 may be 3% to 10% of that of the support 2 in view of maintaining the effective area for power generation while enhancing robustness of the cell 1.

In view of enhanced robustness, the thickness of the reinforcement layer 7 may be increased compared to that of the solid electrolyte layer 4. Thus, the thickness of the reinforcement layer 7 may range, for example, 30 μm to 100 μm whereas the thickness of the solid electrolyte layer 4 may be thinner than 30 μm.

An exemplary method for manufacturing the cell 1 according to a non-limiting embodiment will now be described.

For example, powdered Ni and/or NiO, powdered rare earth oxide, such as $Y_2O_3$, an organic binder, and a solvent are mixed to prepare a clay soil. A green compact of a support is prepared by extrusion molding with the clay soil, and is then dried. The green compact of the support may be calcined for 2 to 6 hours at a temperature in the range of 900° C. to 1000° C.

Subsequently, raw materials of NiO and $ZrO_2$ (YSZ) containing dissolved $Y_2O_3$ are weighed and mixed in accordance with a predetermined proportion. The powder mixture is then blended with an organic binder and solvent into a slurry for fuel electrode.

The powdered $ZrO_2$ containing dissolved rare earth oxide are then mixed with toluene, a powdered binder (containing higher molecules than powdered binder adhering to powdered $ZrO_2$ as described below, such as acrylic resin), and a commercially available dispersant into slurry. The slurry is then shaped into a sheeted solid electrolyte layer compact through, for example, doctor blading.

The slurry for fuel electrode is applied to the resulting sheeted solid electrolyte layer compact and dried into a fuel electrode compact. A sheeted laminated compact is eventually produced. The sheeted laminated compact of the fuel electrode compact and solid electrolyte layer compact is laminated on the green compact of the support such that the face of the fuel electrode compact comes into contact with the green compact of the support.

Subsequently, the laminated compact is calcined for 2 to 6 hours at a temperature in the range of 800° C. to 1200° C. to yield a calcined compact.

For example, powdered Ni and/or NiO having a smaller particle size than the base powder of the support compact is then mixed with rare earth oxide powder, such as $Y_2O_3$ having a particle size equal to or smaller than the base powder of the support compact, an organic binder, and a solvent to yield a slurry to be sintered. Instead, a sintering agent, such as boron oxide, ferric oxide, and a lanthanum chromite-based perovskite oxide ($LaCrO_3$ based oxide) may be mixed with a binder and a solvent to prepare a slurry to be sintered.

The slurry is applied to a targeted site of the calcined compact or the calcined compact is coated with or immersed in the slurry, and the compact is recalcined for 2 to 6 hours at a temperature in the range of 800° C. to 1200° C.

The production of the cell 1 including the reinforcement layer 7 illustrated in FIGS. 6A and 6B employs, for example, a slurry of the powdered $ZrO_2$ containing less dissolved rare earth oxide than the slurry for the solid electrolyte layer compact described above and a powdered binder. Such a slurry is applied to the solid electrolyte layer compact (calcined compact) in the lower end portion E1 of the support 2 and is dried.

Base powder for the interconnection layer (such as powdered $LaCrMgO_3$ based oxide) is mixed with an organic binder and a solvent to prepare a slurry for the interconnection layer. Subsequently, the slurry is applied to the solid electrolyte compact (calcined compact) such that the interconnection layer compact is laminated on the solid electrolyte compact at its ends. In the case of production of the cell 1 having the reinforcement layer 7 in FIGS. 6A and 6B, the slurry is applied such that the interconnection layer compact is laminated on the compact of the reinforcement layer 7 at its ends.

The laminated compact is subjected to debinding and simultaneous sintering (simultaneous baking) for 2 to 6 hours at a temperature in the range of 1400° C. to 1450° C. in an oxygen-containing atmosphere.

The slurry containing base powder for the oxygen electrode layer (such as powdered $LaCoO_3$ based oxide), a solvent, and a pore forming agent is applied to the solid electrolyte layer by, for example, dipping and is baked for 2 to 6 hour at a temperature in the range of 1000° C. to 1300° C. The cell 1 having the structure according to a non-limiting embodiment in FIGS. 1A and 1B or FIGS. 6A and 6B can be thereby manufactured.

Figure 9:
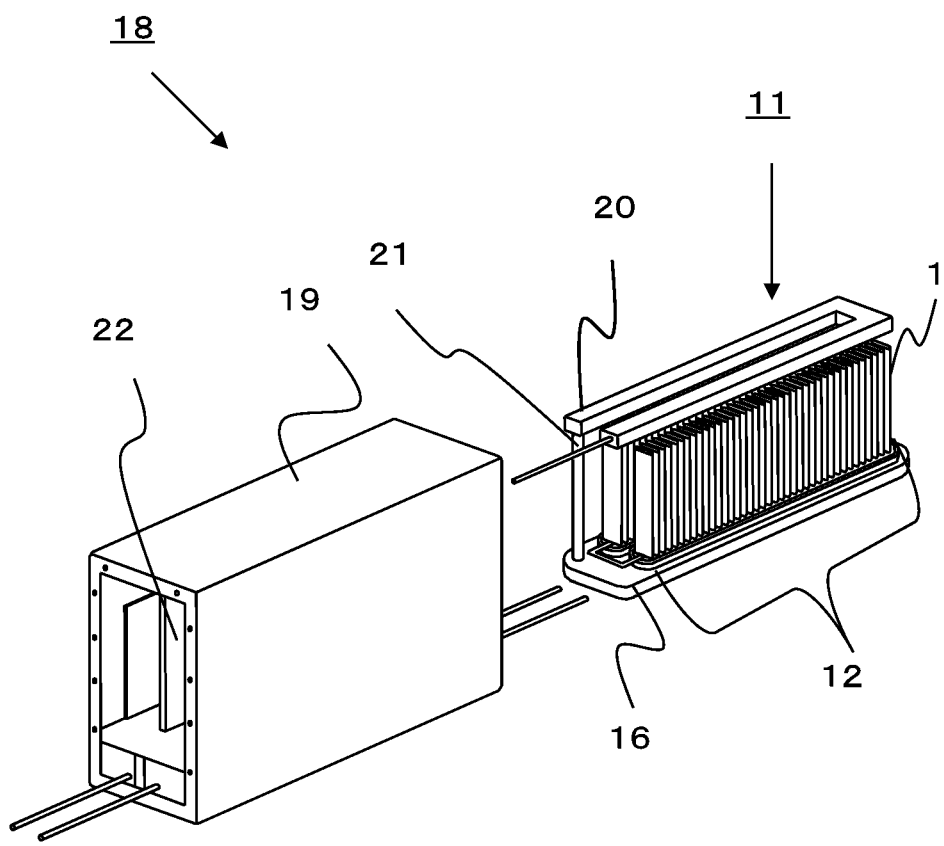
FIG. 9 is an external perspective view of an exemplary fuel cell module according to a non-limiting embodiment.

FIG. 9 is an external perspective view of an exemplary fuel cell module 18 accommodating the cell stack assembly 11 in a container. The fuel cell module 18 accommodates the cell stack assembly 11 illustrated in FIG. 4 in a cuboidal container 19.

In order to feed fuel gas into the cells 1, a reformer 20 reforming a raw fuel, such as natural gas and heating oil, is disposed over the cell stack 12. The fuel gas generated in the reformer 20 is fed to the manifold 16 through a gas flow tube 21 and fed into the gas channels 2a disposed in the cell 1 through the manifold 16.

In FIG. 9, part of the container 19 is detached (in the direction from the rear to the front), and the cell stack assembly 11 and the reformer 20 are drawn backward from the container 19. In the module 18 of FIG. 9, the cell stack assembly 11 can be slid into the container 19. The cell stack assembly 11 may include the reformer 20.

An oxygen-containing gas introducing member 22 in the container 19 is disposed between the opposing cell stacks 12 on the manifold 16 in FIG. 9. The oxygen-containing gas is fed to the lower end portion of the cell 1 so as to flow from the lower end portion to the upper end portion at both sides of the cell 1 in accordance with the flow of the fuel gas. The fuel gas discharged from the gas channels 2a in the cell 1 reacts with the oxygen-containing gas to be combusted in the upper end portion of the cell 1, resulting in an increase in temperature of cell 1 and acceleration of the activation of the cell stack assembly 11. The combustion of the fuel gas by oxygen-containing gas discharged from the respective gas channels 2a in the cells 1 in the upper end portions of the cells 1 allows the reformer 20 over the cells 1 (cell stacks 12) to be warmed. Thus, the reformer 20 can effectively promote the reforming reaction.

In the module 18 according to a non-limiting embodiment, the cell stack assembly 11 including the cells 1 is accommodated in the container 19. Thus the module 18 has an enhanced long-term reliability.

Figure 10:
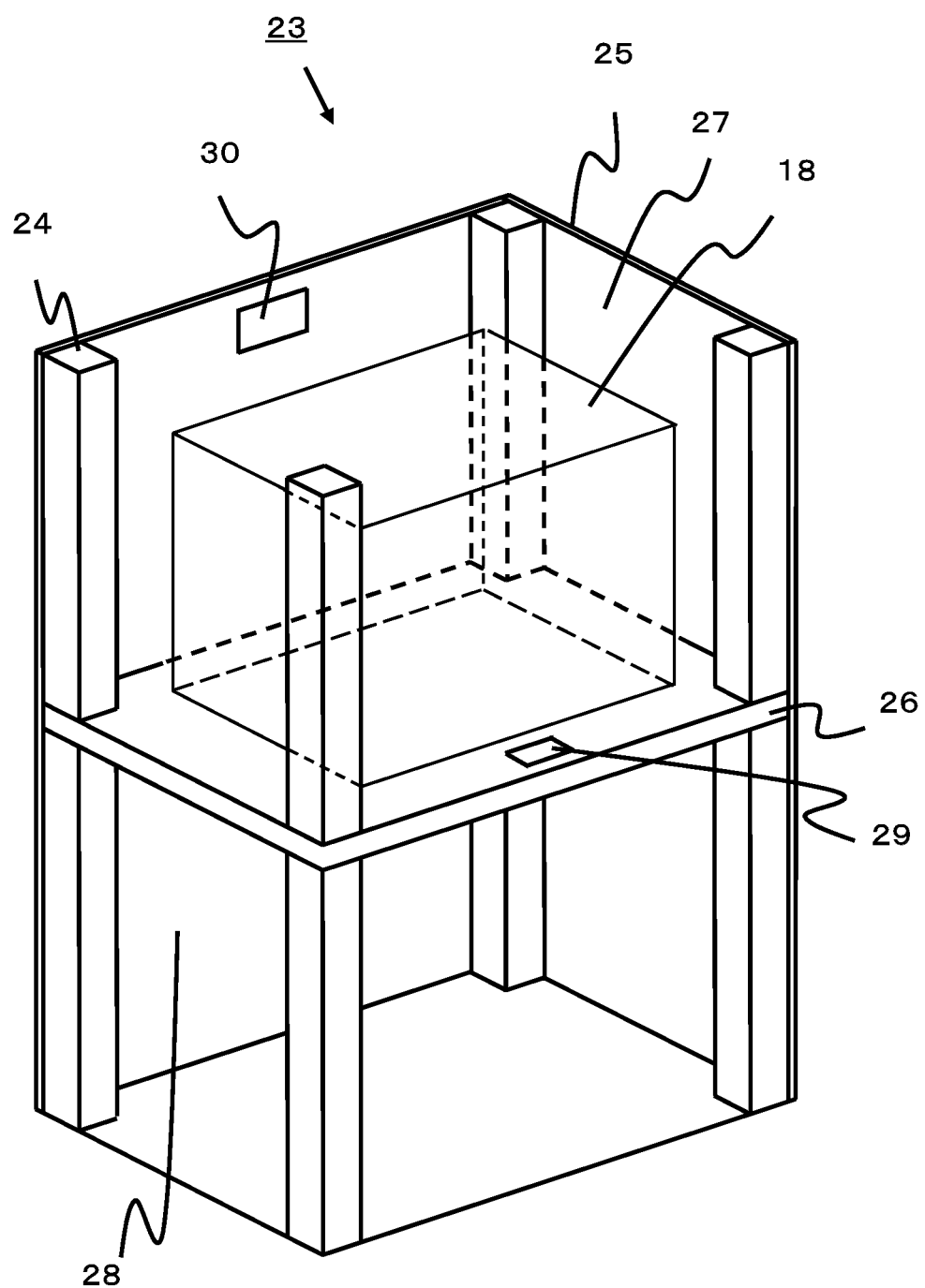
FIG. 10 is a perspective view of a module-accommodating assembly according to a non-limiting embodiment, where part of the assembly is not illustrated.

FIG. 10 is a perspective view of an exemplary fuel cell assembly or a module-accommodating assembly accommodating the module 18 of FIG. 9 and accessories operating the cell stack assembly 11 in an exterior case. In FIG. 10, part of the configuration is not illustrated.

A module-accommodating assembly 23 in FIG. 10 includes an exterior case including pillars 24 and outer plates 25 and divided in upper and lower spaces by a partition panel 26. The upper space is referred to as a module chamber 27 accommodating the module 18 described above, and the lower space is referred to as an accessary chamber 28 accommodating accessories for operation of the module 18. The accessories accommodated in the accessary chamber 28 are not illustrated.

The partition panel 26 is provided with a ventilation hole 29 circulating air in the accessary chamber 28 to the module chamber 27. One of the outer plates 25 of the module chamber 27 is provided with an air vent 30 for discharge of air from the module chamber 27.

The module-accommodating assembly 23 accommodates the above module 18 having enhanced long-term reliability in the module chamber 27. Thus, the long-term reliability of the module-accommodating assembly 23 is also enhanced.

In the above non-limiting embodiment, a fuel cell, a cell stack assembly, a fuel cell module, and a fuel cell assembly have been described. The present disclosure, however, should not be limited to any one embodiment described above. The disclosure is applicable to a solid oxide electrolysis cell (SOEC) that is supplied with vapor and voltage to electrolyze the vapor (water) into hydrogen and oxygen ($O_2$). In this case, both ends of the cell are fixed to the manifold with a bonding agent in a cell stack assembly. Thus, the upper and lower end portions each have a lower porosity than the central portion such that the support has enhanced robustness at the ends, resulting in a reduction in cracking, and thus the cell has enhanced long-term reliability. The disclosure is also applicable to a cell stack assembly including this cell, a module, and a module-accommodating assembly, which have enhanced long-term reliability.

Examples

Powdered NiO having an average particle size of 0.5 µm was mixed with powdered $Y_2O_3$ having an average particle size of 2.0 µm, an organic binder, and a solvent to prepare a clay soil. A green compact of a support was prepared by extrusion molding with the clay soil and was then dried and degrease. A conductive green compact of the support was thus produced. NiO and $Y_2O_3$ contents in the green compact of the support were 48% and 52%, respectively, by volume after the reduction reaction.

Powdered $ZrO_2$ containing dissolved 8 mol % $Y_2O_3$ and having a particle size of 0.8 µm, which was measured by the Microtrac scheme, was mixed with a powdered binder and a solvent. The resulting slurry was shaped into a solid electrolyte layer sheet by doctor blading.

Powdered NiO having an average particle size of 0.5 µm was mixed with powdered $ZrO_2$ containing dissolved $Y_2O_3$, an organic binder and a solvent to prepare a slurry for a fuel electrode layer. The slurry was applied to the solid electrolyte layer sheet by screen printing and then dried to yield a fuel electrode layer compact.

The solid electrolyte layer sheet was laminated on the sheeted fuel electrode layer compact. This sheeted compact was laminated on the green compact of the support at a predetermined position such that the face of the fuel electrode layer compact came into contact with the green compact of the support.

Then, the laminated compact was calcined for 3 hours at 1000° C. to yield a calcined compact.

Subsequently, powdered NiO having an average particle size of 0.05 µm was mixed with powdered $Y_2O_3$ having an average particle size of 0.2 µm, an organic binder, and a solvent to prepare a slurry to be sintered. A targeted site of the calcined compact was coated with or immersed in the slurry, and the compact was recalcined for 3 hours at 1000° C. In a cell of Example in Table 1 to be described below, the lower end portion of the compact was immersed in the slurry. In another cell of Example in Table 2, the slurry was applied to only the first main face (adjacent to the fuel electrode layer) in the lower end portion of the green compact of the support. In another cell of Example in Table 3, the slurry was applied to only a second main face (adjacent to an interconnection layer) in the central portion of the green compact of the support.

In Example and Comparative Example in Table 2, a slurry was applied to a first main face in the lower end portion of the green compact of the support to yield a reinforcement layer compact, where the slurry was a mixture of powdered $ZrO_2$ containing dissolved 3 mol % $Y_2O_3$ and having a particle size of 0.8 µm, which was measured by the Microtrac scheme, a powdered binder, and a solvent.

Subsequently, $La(Mg_{0.3}Cr_{0.7})_{0.96}O_3$ having an average particle size of 0.7 µm was mixed with an organic binder and a solvent to prepare a slurry for the interconnection layer. The prepared slurry was applied to an exposed site, which was not covered by the fuel electrode layer (and the solid electrolyte layer), of the support, in the central portion of the calcined solid electrolyte layer compact extending toward the upper and lower end portions.

The laminated compact was subject to debinding and simultaneous burning for 2 hours at 1450° C. in the atmosphere, and then the slurry for the oxygen electrode layer was applied to the solid electrolyte layer compact. The laminated compact was then baked for 2 to 6 hours at 1000° C. to 1300° C. The cell was thereby produced.

The produced cell had dimensions of 25 mm by 170 mm. The support 2 had a thickness of 2 mm (the distance between the flat faces n). The fuel electrode layer had a thickness of 10 µm. The solid electrolyte layer had a thickness of 10 µm. The interconnection layer had a thickness of 50 µm.

In Comparative Example, components were prepared as in Example except that the compact was not coated with or immersed in the slurry.

Seven cells according to Example were prepared and arrayed between electroconductive members and fixed to a manifold with a bonding agent to build a cell stack assembly. Similarly, seven cells according to Comparative Example were prepared and arrayed into a cell stack assembly. The cell stack assembly was subjected to a reduction reaction. An endurance test, for example, a heat cycle test was then conducted and the occurrence of cracking on the supports of the cells was observed, for example, visually or metallographically.

The porosity was determined as follows: three of the seven cells according to the Example and the Comparative Example were arbitrarily taken from the cell stack assembly, and then cut and used for measurement of the porosity by Archimedes' method. The cut samples each had dimensions of 20 mm by 10 mm and a thickness of 1 mm. The three samples were taken from each area. Each porosity was the average of the three samples. The results are indicated below.

Table 1 shows the porosities at the central portion and the lower end portion of the support and occurrence of cracking on the support.

Table 2 shows the porosities at the first main face and the second main face of the lower end portion of the support and occurrence of cracking on the support.

Table 3 shows the porosities of the first main face and the second main face in the central portion of the support and occurrence of cracking on the support.

In the column of occurrence of cracking on the support in Tables 1 to 3, a sample with no crack on the support is indicated as "not found", and a sample with at least a crack on the support is indicated as "found".

TABLE 1

| | POROSITY (%) | | |
|---|---|---|---|
| | CENTRAL PORTION | LOWER END PORTION | CRACKING ON SUPPORT |
| EXAMPLE | 32.0 | 29.1 | NOT FOUND |
| COMPARATIVE EXAMPLE | 32.0 | 32.0 | FOUND |

TABLE 2

| | POROSITY (%) | | |
|---|---|---|---|
| | FIRST MAIN FACE IN LOWER END PORTION OF SUPPORT | SECOND MAIN FACE IN LOWER END PORTION OF SUPPORT | CRACKING ON SUPPORT |
| EXAMPLE | 29.1 | 30.4 | NOT FOUND |
| COMPARATIVE EXAMPLE | 32.0 | 32.0 | FOUND |

TABLE 3

| | POROSITY (%) | | |
|---|---|---|---|
| | FIRST MAIN FACE IN CENTRAL PORTION OF SUPPORT | SECOND MAIN FACE IN CENTRAL PORTION OF SUPPORT | CRACKING ON SUPPORT |
| EXAMPLE | 32.0 | 29.4 | NOT FOUND |
| COMPARATIVE EXAMPLE | 32.0 | 32.0 | FOUND |

As apparent from the results on Table 1, Comparative Example has the same porosity at the lower end portion and the central portion of the support and has cracking on the support. In contrast, Example has a lower porosity at the lower end portion of the support than at the central portion and has no cracking.

As apparent from the results on Table 2, the Comparative Example has the same porosity at the first main face and the second main face of the support and has cracking on the support. In contrast, Example has a lower porosity at the first main face of the support than at the second main face and has no cracking.

As apparent from the results on Table 3, Comparative Example has the same porosity at the first main face and the second main face in the central portion of the support and has cracking on the support. In contrast, Example has a lower porosity at the second main face in the central portion of the support than at the first main face in the central portion and has no cracking.

REFERENCE SIGNS LIST 1 cell
2 support
2a gas channel
3 first electrode layer (fuel electrode layer)
4 solid electrolyte layer
6 second electrode layer (oxygen electrode layer)
7 reinforcement layer
8 interconnection layer
11 cell stack assembly
18 module (fuel cell module)
23 module-accommodating assembly (fuel cell assembly)

What is claimed is:

1. A cell comprising:
a columnar support having a first main face and a second main face; and
an element comprising a first electrode layer, a solid electrolyte layer, and a second electrode layer, laminated in sequence on the first main face of the support,
wherein
the porosity of at least one of two end portions of the support in the longitudinal direction is lower than that of the central portion of the support in the longitudinal direction,
the solid electrolyte layer comprises an oxide including a rare earth oxide,
a reinforcement layer is laminated on the solid electrolyte layer on the first main face at one of the end portions of the support, the reinforcement layer comprising the same oxide as the solid electrolyte layer and including the rare earth oxide in a different content from the solid electrolyte layer,
the reinforcement layer is also laminated on the second main face, and the porosity at the first main face of the support at one of the end portions is lower than that in the second main face.

the central portion on the second main face of the support is provided with an interconnection layer comprising a lanthanum chromite, the porosity of the second main face of the support at the central portion being lower than that of the first main face.

2. The cell according to claim 1, wherein
the central portion on the second main face of the support is provided with an interconnection layer comprising a lanthanum chromite, the porosity of the second main face of the support at the central portion being lower than that of the first main face.

3. A cell stack assembly comprising a plurality of the cells according to claim 1, wherein
one of the end portions of the support is bonded to a manifold with a bonding agent.

4. A module accommodating the cell stack assembly according to claim 3 in a container.

5. A module-accommodating assembly comprising an exterior case accommodating the module according to claim 4 and accessories for operation of the module.

\* \* \* \* \*